United States Patent [19]

O'Neill et al.

[11] Patent Number: 5,027,391
[45] Date of Patent: Jun. 25, 1991

[54] CALL MANAGEMENT SYSTEM

[75] Inventors: John F. O'Neill, Boulder; Lawrence R. Benko, Broomfield, both of Colo.

[73] Assignee: Call Management Products, Inc., Broomfield, Colo.

[21] Appl. No.: 395,750

[22] Filed: Aug. 17, 1989

[51] Int. Cl.⁵ .................. H04M 1/72; H04M 9/02; H04M 19/04

[52] U.S. Cl. .................. 379/373; 379/157; 379/160; 379/418

[58] Field of Search ............... 379/160, 159, 173, 172, 379/418, 401, 373, 393, 162, 217, 163, 157

[56] References Cited

U.S. PATENT DOCUMENTS

| | | | |
|---|---|---|---|
| 4,025,729 | 5/1977 | Stone | 379/418 |
| 4,340,785 | 7/1982 | Awadalla | 379/418 |
| 4,341,928 | 7/1982 | Stauson et al. | 379/418 |
| 4,578,540 | 3/1986 | Borg et al. | 379/40 |
| 4,584,434 | 4/1986 | Hashimoto | 379/100 |
| 4,631,361 | 12/1986 | Miller | 379/351 |
| 4,660,218 | 4/1987 | Hashimoto | 379/93 |
| 4,731,821 | 3/1988 | Jackson, III | 379/172 |
| 4,734,936 | 3/1988 | Tanaka et al. | 379/253 |
| 4,769,837 | 9/1988 | McCormick et al. | 379/393 |
| 4,788,714 | 11/1988 | Hashimoto | 379/74 |
| 4,821,319 | 4/1989 | Middleton et al. | 379/167 |
| 4,893,334 | 1/1990 | Parnello | 379/157 |

Primary Examiner—Thomas W. Brown
Attorney, Agent, or Firm—James R. Young

[57] ABSTRACT

A call management system connected locally between a central office telephone company switching station (CO) and a conventional single telephone line having multiple extensions provides call paging and intercom capabilities between the multiple telephone extensions. An integrated voltage generator supplies a high voltage, local ringing voltage for ringing the local extensions independent from the CO and a low voltage talk or "battery" feed to the local telephone when they are operated independently from the CO. Line splitting apparatus temporarily separates the CO from the local extensions when the local ringing voltage is generated by the integrated voltage generator and injected into the local telephone extensions. A hold deivce mimics an active local telephone off the hook, thereby keeping a call from the CO holding when the local telephones are being used in the paging or intercom modes. Detection devices detect touch tone or rotary dial inputs as well as off hook conditions of local telephones for initiating various local paging and intercom functions between the local extensions. Tone injector apparatus place a dial tone-like sound in the local telephones when they are separated from the CO. A central office ring detector detects a high voltage ring signal from the CO and signals the local users during intercom operation that a call is coming in from the CO and is waiting to be picked up.

22 Claims, 10 Drawing Sheets

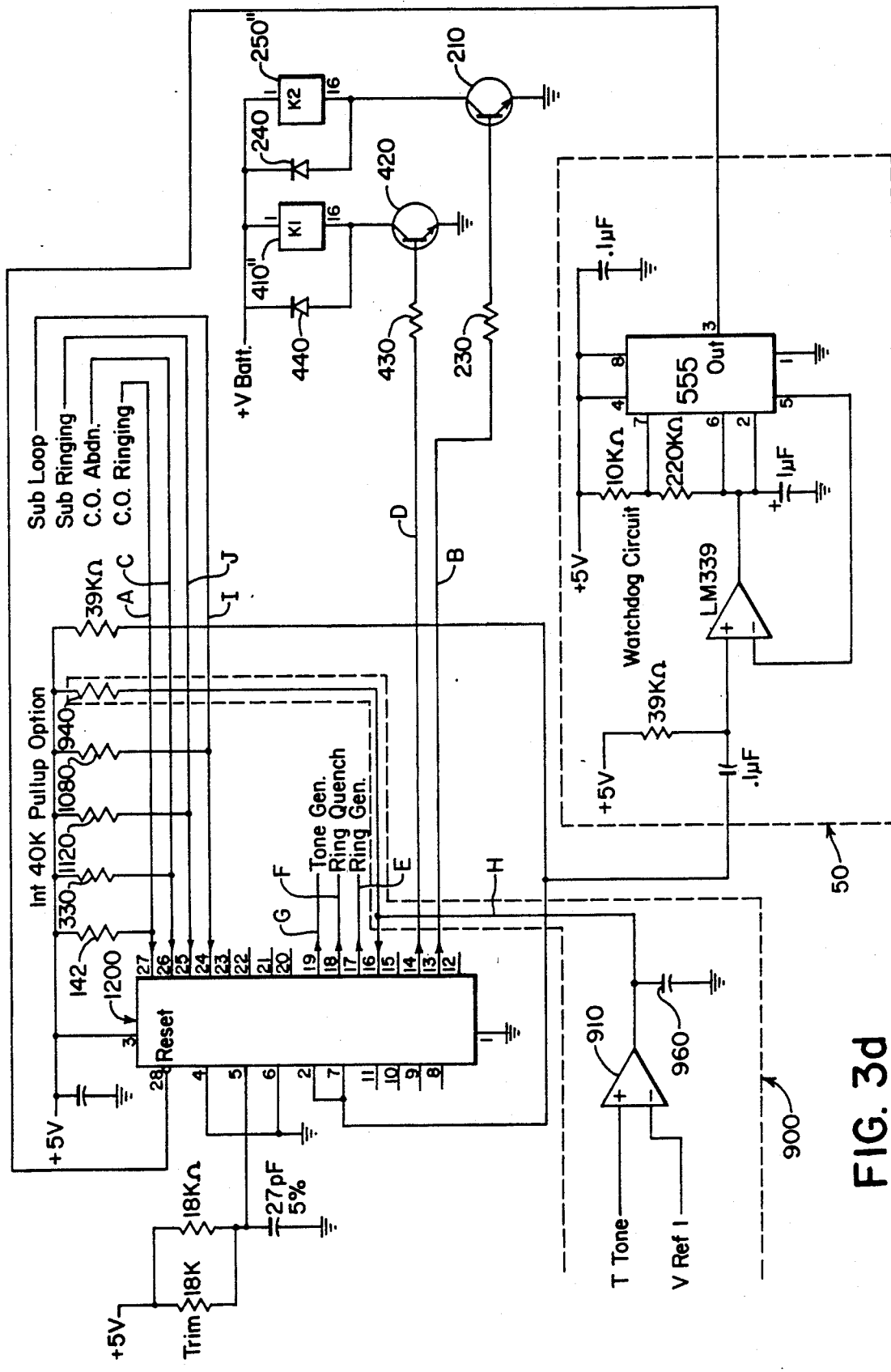

Ring Control Voltage on Path E

Quench Control Voltage on Path F

Ring Generator Voltage at Capacitor 210V
200V

Current in Inductor 710

I_max
∅

CALL MANAGEMENT SYSTEM

FIELD OF THE INVENTION

The present invention relates generally to telephone systems and specifically to a method and apparatus for providing PBX type paging features to a shared, one-line telephone system.

BACKGROUND OF THE INVENTION

Central Office (CO) telephone systems make up most of the current verbal communications networks of the world. Each CO interconnects thousands of local offices and homes with twoway communications via telephone lines. A CO generally directs a call to a specific telephone number in a home, office, or other facility based on the number dialed by the person or machine that initiates the call. This call-directing function at the CO was in the past performed by a switch board operator who physically plugged in the appropriate wires to the appropriate sockets to make the connection, but it is now generally done by computers. Once that number is reached by the caller, a person at the receiving number answers the telephone, and the caller must verbally ask for the person to whom he wishes to speak. Of course, this person to person request may also be done by a CO operator. In any case, once the receiver gets the call, he or she then must locate the person to whom the caller wishes to speak. Many offices and businesses have PBX type switchboards or other intercom and notification systems for directing calls to specific persons, but most residences do not have such expensive equipment installed.

With the recent dramatic drop in cost of today's home telephones in conjunction with federal law allowing homeowners more unregulated use of telephone lines and extension phones in their homes, many homes now have multiple extension telephones sharing a single line. In a house with, for example, a kitchen telephone and two bedroom telephones, the person answering the telephone usually has to shout to find the proper call receiver. Some houses are equipped with intercom systems to accomplish this function, but most are not. While the house telephone is off the hook and the proper call receiver is being sought, the telephone line is tied up, and no other calls can come in. No low cost method is available today to page for the proper call receiver by using the various existing home telephones as paging devices.

SUMMARY OF THE INVENTION

Accordingly, a general object of the present invention is to provide a simple low cost call manager that enables multiple telephones sharing a common line to function as a paging system.

A more specific object of this invention is to provide a switch hook flash and dial method for a user to activate a specific number of rings on a remote extension phone on the same line to page a proper call receiver.

It is also a specific object of this invention to provide a user with the capability of using his local telephones as an intercom system.

A further specific object of this invention is to provide a means for using a local telephone system as a conference calling center.

A further specific object of this invention is to enable incoming calls to come in while all of the above-described objects of this invention are functioning.

A further specific object of this invention is to accommodate all central office customer calling features including three-way calling, call forwarding and speed dialing, along with local intercom paging and conference call features.

Additional objects, advantages, and novel features of the invention are set forth in part in the description that follows, and in part will become apparent to those skilled in the art upon examination of the following specification or may be learned by the practice of the invention. The objects and advantages of the invention may be realized and attained by means of the instrumentalities, combinations, and methods particularly pointed out in the appended claims.

To achieve the foregoing and other objects and in accordance with the purposes of the present invention, as embodied and broadly described herein, the article and apparatus of this invention may comprise call manager apparatus connected locally between a central office (CO) telephone company switching station and a plurality of local telephones sharing a single line.

The call manager apparatus comprises local ringing voltage generator apparatus for generating a local high voltage ring signal capable of powering and actuating high-voltage signaling devices, such as bells, ringers, or the like, of the local telephones sharing the single line and for actuating those signaling devices independent of the CO. Line splitting apparatus is provided between the local ringing voltage generator apparatus and the CO to temporarily separate the CO from the local telephones when the local ringing voltage generator apparatus is actuated. The call manager apparatus also includes a local talk power supply for providing a substitute low voltage talk or "battery" feed to the local telephones when the line splitting apparatus has the local telephones temporarily disconnected from the CO. Boost voltage generator apparatus and a reactive quench voltage circuit connected to the local talk power supply produce the high ringing voltage of the local ringing voltage generator, and a regulator circuit maintains the desired peak voltage of the ringing signal.

The call manager of this invention also includes a CO hold device positioned between the line-splitting apparatus and the CO for shunting current between the ring and tip lines to the CO to mimic an active local telephone off the hook, thereby keeping the CO switching circuits connected and a call holding while the local telephones are disconnected from the CO by the line-splitting apparatus during intercom or paging with the local telephones. It also includes detection devices or circuits connected to the ring and tip lines between the line-splitting apparatus and the local telephones to detect touch tone or rotary dial inputs, as well as off-hook conditions of the local telephones, and a tone injector for placing a dial tone-like sound in the local telephones when the line-splitting apparatus has the local telephones separated from the CO. Further, a CO ring detector between the CO and the line-splitting apparatus detects a high voltage ring signal from the CO when the CO is disconnected from the local telephones by the line-splitting apparatus and outputs a signal to initiate a sound in the local telephones to let local users during intercom know a call is coming in from the CO and is waiting to be picked up.

BRIEF DESCRIPTION OF THE DRAWINGS

The accompanying drawings, which are incorporated in and form a part of the specifications illustrate the preferred embodiments of the present invention, and together with the description explain the principles of the invention. In the drawings:

FIGS. 3a–d comprise an electronic schematic of the call manager;

DETAILED DESCRIPTION OF THE PREFERRED EMBODIMENT

The call manager 10, according to the present invention, comprises specific capabilities including placing an incoming call on hold by sensing a switch hook flash, i.e., depressing the telephone receiver hook (2020 in FIG. 2) once. Once an incoming call is on hold, then the user can dial a designated code or ringing cadence code into his telephone, which causes a specific pattern or ring cadence to be emitted by all of the local telephone extensions on that line. These designated codes and resulting ring patterns can be pre-arranged by the users among all the possible proper receivers to indicate who is being paged to pick-up an extension telephone. For example, a first user knows that an incoming call is for him if he hears a pattern of three short rings followed by a pause, then repeating. If the first user does not answer his page and pick up the call, then any other user can pick up any extension and take a message for the first user. The call manager 10 stops ringing the page signal as soon as anyone picks up any extension.

The call manager 10 also allows a user to dial a page code or ringing cadence into any phone extension and page someone he wants to talk to. When the paged person or user picks up a phone extension, the local phone system can be used as an intercom system. The call manager alerts the intercom users of any incoming calls. Therefore, the use of the intercom feature does not interfere with incoming calls.

The call manager 10 is also very useful in providing convenience to a number of telephone users in a single line environment, such as in a small office or home. The initial person who answers or takes the call need not shout a message or page for the user to whom the call is directed or use a different paging system. The initial person who answers also does not have to wait around to hang up the phone after the intended user finally answers. This call manager 10 does not require special telephones or special cabling. It can be installed in a conventional telephone line anywhere between the telephones and the telephone company switch or central office (CO).

Figure 1:
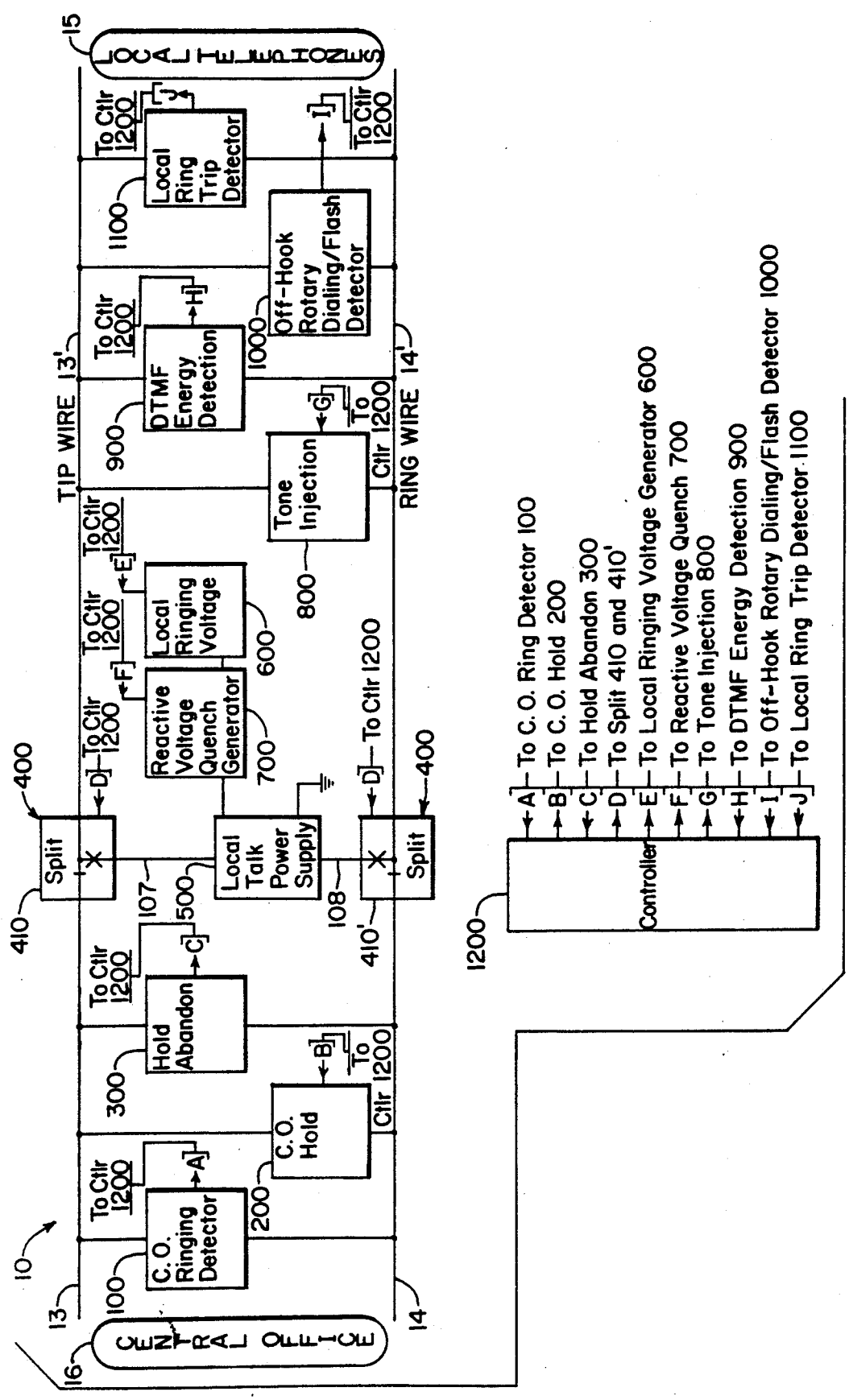
FIG. 1 is a block diagram of the functional components of the call manager according to this invention.

A central office (CO) 16 of a telephone company directs phone calls to and from local telephones 15 in a home or office by means of a pair of wires commonly called the tip wire 13 and the ring wire 14, as illustrated schematically in FIG. 1. These two wires 13, 14 serve many purposes. For example, they carry the dc power to operate the local telephone 15; they carry voice or computer data back and forth between the central office (CO) 16 and the home or office represented in FIG. 1 as the local telephones 15, although it can be a computer modem or other such device (not shown) as is known in the art; and they carry control signals back and forth between the central office (CO) 16 and the local phones 15. Therefore, when an additional communication system component, such as the call manager 10 of this invention, is placed between the local phones 15 and the central office (CO) 16, it is highly desirable to be able to permit the normal functioning of the various signals carried by the phone line 13, 14 in addition to providing new and useful functions to the local user.

Figure 2:
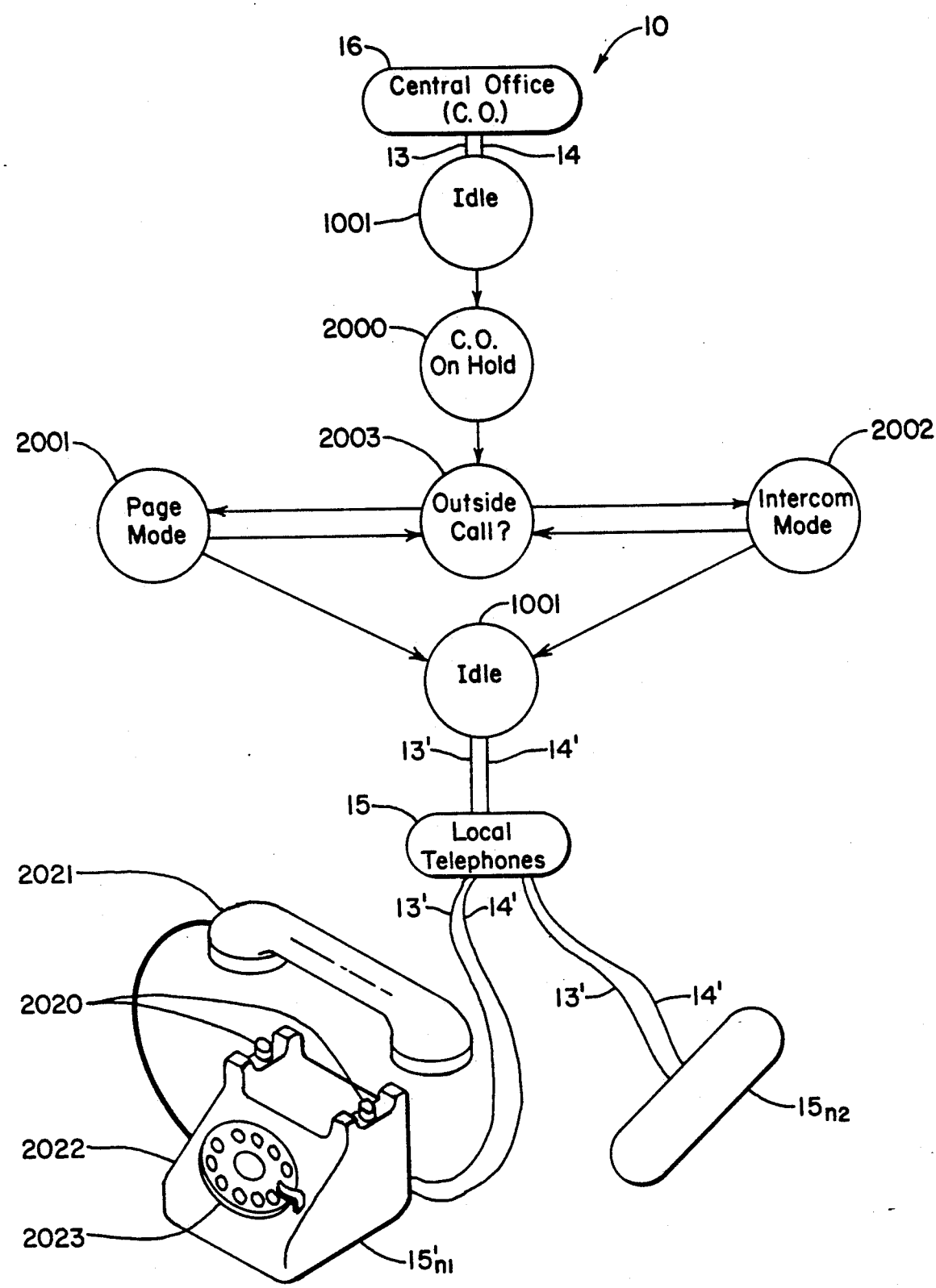
FIG. 2 is a simplified state diagram of the call manager showing the basic logic of the call manager.

An overview of the basic components of the call manager 10 is presented in FIG. 2. A central office (CO) 16 represents the local telephone company. A tip wire 13 and a ring wire 14 connect the CO 16 to the local telephones 15. The call manager 10 is connected between the CO 16 and a group of local telephones represented by the block 15. This group of local telephones 15 can include any number of local extension telephone units, represented in FIG. 2 as $15_{n1}$ and $15_{n2}$, all connected to the call manager 10. Therefore, the whole group of local telephones will be referred to for convenience as local telephones 15, while individual telephone sets in the group will be referred to for convenience as $15_{nl}$ and $15_{n2}$.

It must be remembered that this is a single line (13, 14) phone system having a group of local telephones $15_{n1}$, $15_{n2}$ sharing the single line (13, 14) as extensions. The local extension telephones $15_{n1}$, $15_{n2}$ are shown and described herein as basic, conventional telephones without any intercom features. For example, local telephone $15_{n1}$ has a receiver 2021, a switch hook 2020, an enclosure 2022, and dialing apparatus 2023, which can be a conventional dialer, touch tone, or other suitable dialing device. Local extension telephone $15_{n2}$ is shown for simplicity as a block in the diagram, but it is understood that it can have the same basic features as those represented by the telephone $15_{n1}$. The local telephones 15, as shown and described herein, also includes any telephone-like receiver device such as a facsimile machine, a computer modem and the like.

The call manager 10 has two basic operating modes. The page mode 2001 allows a user to simply dial a ringing cadence code, such as "three rings", into any local telephone extension, such as extension telephone $15_{n1}$, and thereby activate "three rings" on all the local telephones $15_{n1}$, $15_{n2}$. Each of the users of local telephones 15 can be pre-assigned a certain unique number of rings or ring pattern as his or her paging code. This unique paging code notifies the local user to pick-up any local telephone extension 15. For example, if a first user hears three rings, he or she goes to the nearest local telephone extension 15, such as $15_{n2}$, and picks up the receiver to talk.

In operation during the page mode 2001 the call manager 10 works as follows. An incoming call is directed by the CO 16 to the local telephones 15 in the house. Any initial user answers, for example, telephone $15_{n1}$. That initial user may be told by the caller that the caller wishes to speak to a specific second user. The initial user can then flash the switch hook 2020 once to put the call on hold. Then the initial user may dial, for example, the number "3" on the dialer 2023 to initiate a 3-ring paging code that has been preassigned to be the page for the second user to whom the caller wishes to speak. The call manager 10 senses the switch hook flash and initiates the hold function 2000, and it senses the dialer 2023 input for the number "3" and initiates the three ring paging code on all the local telephones 15. The initial user can then hang up his or her phone right after dialing the second user's page code. When the second user hears his or her 3-ring page code, he or she can pick up any local telephone extension $15_{n1}$ or $15_{n2}$ and complete the call. Alternatively somebody else could pick up any local telephone extension $15_{n1}$ or $15_{n2}$ and take a message for the second user.

The other basic mode of operation for the call manager 10 is the intercom mode 2002. The intercom mode 2002 may be used by a first user to speak to a second user locally without any incoming call. To do so, the first user may pick up any local telephone, such as $15_{n1}$, flash the switch hook once, and dial the number "3" to page the second user. The first user must hang up his or her phone $15_{n1}$ to allow ringing, and leave it on-hook until the repeating 3-ring page code stops. The stopping of the 3-ring page code indicates to the first user that the second user has picked up a telephone, such as $15_{n2}$, whereupon the first user can pick up telephone $15_{n1}$ again and talk to the second user. The call manager 10 supplies local power, thereby enabling the first user and the second user to converse on local telephones $15_{n1}$ and $15_{n2}$ without power from the CO 16. Simultaneously with the initial switch hook flash, the call manager 10 drops the CO line in function 2000 and is constantly vigilant for an outside call in function 2003. Should an outside call come in while the first and second users are conversing on phones $15_{n1}$ and $15_{n2}$, then the call manager 10 sends a special tone to the first and second users on their telephones $15_{n1}$ and $15_{n2}$. They can either ignore the incoming call or can hang up to receive the incoming call. If only one user is off hook, he may perform a switch hook flash and receive the call.

FIG. 1 shows schematically all the functional components necessary to practice this invention. The call manager 10 is comprised of a controller 1200, a central office (CO) ringing detector 100, a CO hold function 200, a CO hold abandon detection function 300, line splitting apparatus 400 comprising line splitting relays 410 and 410', and control circuitry 420, a local power supply 500, a local ringing voltage generator 600, a reactive voltage quench function 700, a tone injection function 800, a touch tone (DTMF) energy detection function 900, an off-hook (flash) or rotary dialing detection function 1000, and a local ring trip (ring stop) function 1100. All of the above functions intercede between the central office (CO) 16 tip wire 13 and ring wire 14 and the local telephones 15 as shown in FIG. 1. In the call manager circuitry, several of these functions are performed by common or closely associated circuitry, as is shown in FIG. 3 and will be described in more detail below.

The call manager 10 enables the local telephones 15 to be used in an intercom mode, as described above. The local power supply 500 serves to provide a talking current for the local telephones 15 during this intercom mode of operation, as well as during the ring pager inputting state and the local ringing state that were described above.

Referring to FIG. 1, the CO ringing detector 100 is always functional. It notifies the controller 1200 through signal path A that ringing voltage is present from the CO 16. This means that at all times the user can be alerted to an incoming call. The output of the CO ringing detector 100 follows the conventional incoming ringing pattern generated by the CO 16. Therefore, an intercom user of the local telephones 15 can always be informed that an incoming call of a particular pattern is present, which is important in party line systems where a particular ring pattern designates whether or not the incoming call is for a particular one of the local telephones 15. Incoming ringing is usually a large ac voltage at 20 Hz, referred to herein as a high ringing voltage or a ringing voltage, which is superposed on a negative dc voltage of approximately 48 volts.

The CO hold function 200 is designed to substitute for and replace the conventional function of a telephone that tells the CO 16 that the line is still in use with an existing call. Therefore, the CO 16 will not disconnect that call from the line when the hold function 200 is operating. The CO hold function 200 provides a dc path for the local talk (also known as the battery feed) current from the CO 16. The CO hold function 200 comprises a resistor and a switch apparatus across the tip wire 13 and ring wire 14 under the control of the controller 1200 through signal path B, as will be described in more detail below.

"Battery" feed is a traditional term in the communications field and is used to refer to the low voltage, or talk voltage used in telephone devices, and it includes any such low voltage feed, whether from a traditional battery or from any other low voltage power supply.

The CO hold abandon detection circuit 300 is needed to detect that the party calling through the CO 16 has hung up. Usually, the CO 16 indicates such a hang-up by the calling party by momentarily removing the talk voltage local talk or battery feed current from the tip wire 13. If the call manager 10 were in the hold or local ringing state, then the momentary loss of the local talk current would be detected by the hold abandon function 300, which would then output a signal to the controller 1200 over signal path C to return the call manager 10 to the idle state where it awaits another incoming call. It should be noted that not all CO 16's provide this abandoned call signal. In this event, the user would return the call manager 10 to the idle state by picking up the receiver, and finding nobody present, and then hanging up.

The line splitting apparatus 400 uses relays 410 and 410' to separate the local telephones 15 served by the call manager 10 from the CO 16. This separation is needed for intercom calling, local ringing, and during ring page inputting. Line splitting relays 410 and 410' are controlled by control circuitry 420 that receives a signal from controller 1200 through signal path D.

A local ringing voltage generator 600 is activated by controller 1200 through signal path E to provide a 20 Hz ac ringing voltage, which activates the high voltage alerting device or bell of the local telephones 15. The local ringing voltage generator 600 is current limited for user and installer safety. The high voltage ringing signal is biased by a dc voltage to facilitate detection of an off-hook condition by any local telephone 15 by detecting the dc current flow caused by an off-hook condition.

The quench circuit 700, actuated by the controller 1200 through signal path F, damps and grounds reactive voltage produced by ringing bell or signal devices of local telephones during the low voltage phrase of an oscillating ringing voltage generation by the call manager 10.

The tone injection circuit 800, actuated by controller 1200 through signal path G, functions during intercom use of the local telephones 15. The tone injection circuit 800 sounds, for example, three beep tones and then an incoming call tone to the intercom users of the telephones 15, thus alerting them to an incoming call.

DTMF energy detecting circuit 900 monitors the local telephones 15 of the touch tone type to detect a paging signal or ringing cadence code and, when such a paging signal is detected, to output a signal to the controller 1200 via signal path H. Different embodiments of the DTMF energy detecting circuit 900 allow for either a recognition of a single tone paging code such as 'number four', or a series of tone pulses such as one, two, three, or four pulses of any touch tone digit. The off-hook or rotary dialing detection circuit 1000 performs the same function for local telephones 15 of the rotary dialing type, outputting a signal to the controller 1200 via signal path I. This function also detects a switch hook flash as will be more fully described below. When such a paging signal is detected, the controller 1200 generates outputs on signal paths D, E, and F to initiate the appropriate paging ring patterns in the local telephones 15, as described above.

The local ring trip detection circuit 1100 monitors the ac and dc voltages of the local telephones 15 to detect a ringing signal and feeds that information to the controller 1200 through signal path J. The ringing is stopped immediately by the controller 1200 upon detection of an off-hook condition to avoid creating a 20 Hz thudding sound in a local telephone 15 earpiece.

The controller 1200 is preferably a microprocessor or an equivalent device used to coordinate all the changes of state of the call manager 10, perform timing functions, remove transient signals, and interpret user actions. The controller controls all the above modules numbered 100 through 1100 in addition to the local extensions 15. The controller 1200 is preferably a low cost mask programmed microprocessor, such as a 6804 or 6805 class microprocessor manufactured by Motorola Inc.

For a description of an actual electronic circuit that can be comprised in the major components described above, reference is made to the circuit diagram on FIGS. 3a–d. In the following description the words "high" or "high signal" when used in describing a digital circuit logic refer to a voltage level in electronic logic circuitry generally corresponding to a logical "1" or "on" signal. Likewise, the words "low" or "low signal" refer to a voltage level that is interpreted by electronic logic circuitry as a logical "0" or "off". Also, all of the operational amplifiers (op-amps) described in these circuits are operated with a single voltage supply. However, op-amps having a conventional dual voltage supply could be substituted in the invention with the requisite circuitry changes, so the present invention should not be regarded as limited to the use of single voltage supply op-amps. Further, the specifics of using op-amps for the purposes described herein are well known in the art and will therefore not be described in great detail here. Only the general function and operation of the op-amps will be described herein, but the description will be detailed enough to provide a sufficient enabling description to allow persons skilled in the art of telephone PBX-type systems to construct a working embodiment.

CO ringing detector 100 is comprised of operational amplifiers (op-amps) 110, 120, resistive elements 130, 132, 134, 136, and 138, capacitive element 140 and the various elements of the voltage dividing network 5000. Briefly, as shown on FIG. 3a, op-amp 110, which is a non-inverting, voltage feedback amplifier, and resistive elements 130, 134 serve to isolate the CO tip and CO ring lines 13 and 14 from the "downstream" control logic electronics of the invention. Resistors 130, 134 are connected in series through the noninverting (+) and inverting (−) inputs of op-amp 110 to provide a sufficiently high dc input impedance so that the operation of op-amp 110 does not interfere with the normal operation of the CO tip and CO ring lines 13, 14. Resistive element 136 provides feedback to the to the inverting (−) input of op-amp 110 for stable operation. Resistor 132 provides forward biasing voltage for op-amp 110 so the ac output thereof is centered about a positive voltage VREF. VREF is a voltage approximately half-way between the supply voltage used to operate the op-amps, (VBATT) and ground. VREF is derived from voltage dividing network 500, as will be more fully described below. This forward biasing of op-amp 110 is required because the op-amp is running from the single supply voltage as described above. The output signal of op-amp 110 is a voltage proportional to the voltage across the CO tip and CO ring lines 13, and 14, but at a lower level suitable for interfacing with the "downstream" circuitry. The output of op-amp 110 is directed at CO-RT to op-amps 120, 310, 320, as shown in FIG. 3b.

The output signal of op-amp 110 is directed to the noninverting (+) input of op-amp 120 that operates as a comparator since it has no feedback. An op-amp operating as a comparator is capable of comparing an unknown voltage to a known voltage and generates a high output when the unknown voltage applied to the noninverting (+) input exceeds the known voltage applied to the inverting (−) input. Capacitive element 140 and resistive element 138 function as an RC coupling circuit to connect the output signal of op-amp 110 into the input of op-amp 120. In this manner, op-amps 110 and 120 function together such that the output of op-amp/comparator 120 is alternatingly high and low when the ac RMS voltage between the CO tip and CO ring lines 13, 14 exceeds 40 volts. Therefore CO ringing detector 100 sends an alternating signal via signal path A to the controller 1200 (shown in FIG. 3d) when a ringing voltage from the CO is detected. A pull-up resistor 142 in FIG. 3d is connected between signal path A and a +5 volt source so that the output of op-amp/comparator 120 can properly interface with the TTL input logic of controller 1200.

Figure 3A:
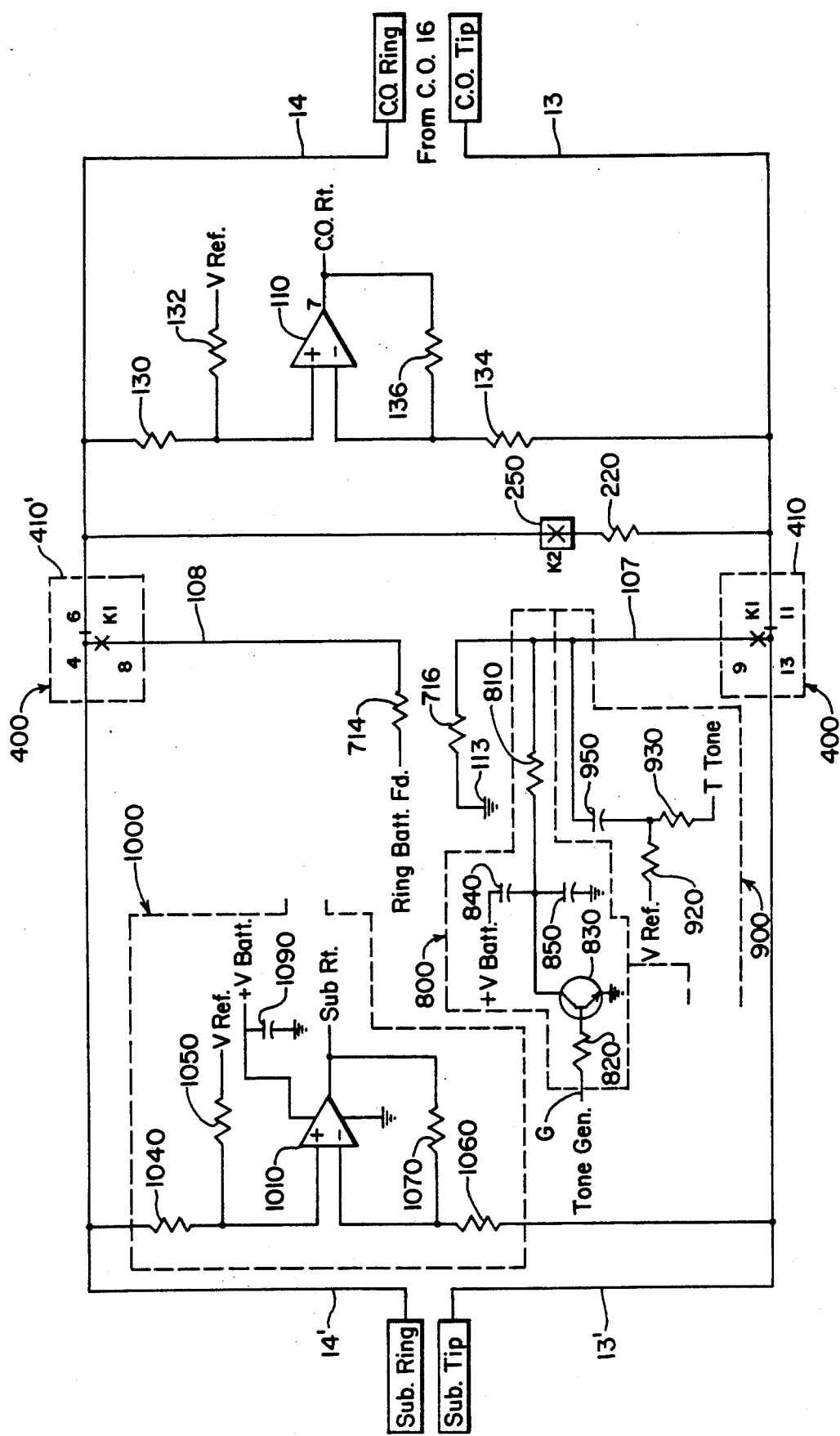
Figure 3B:
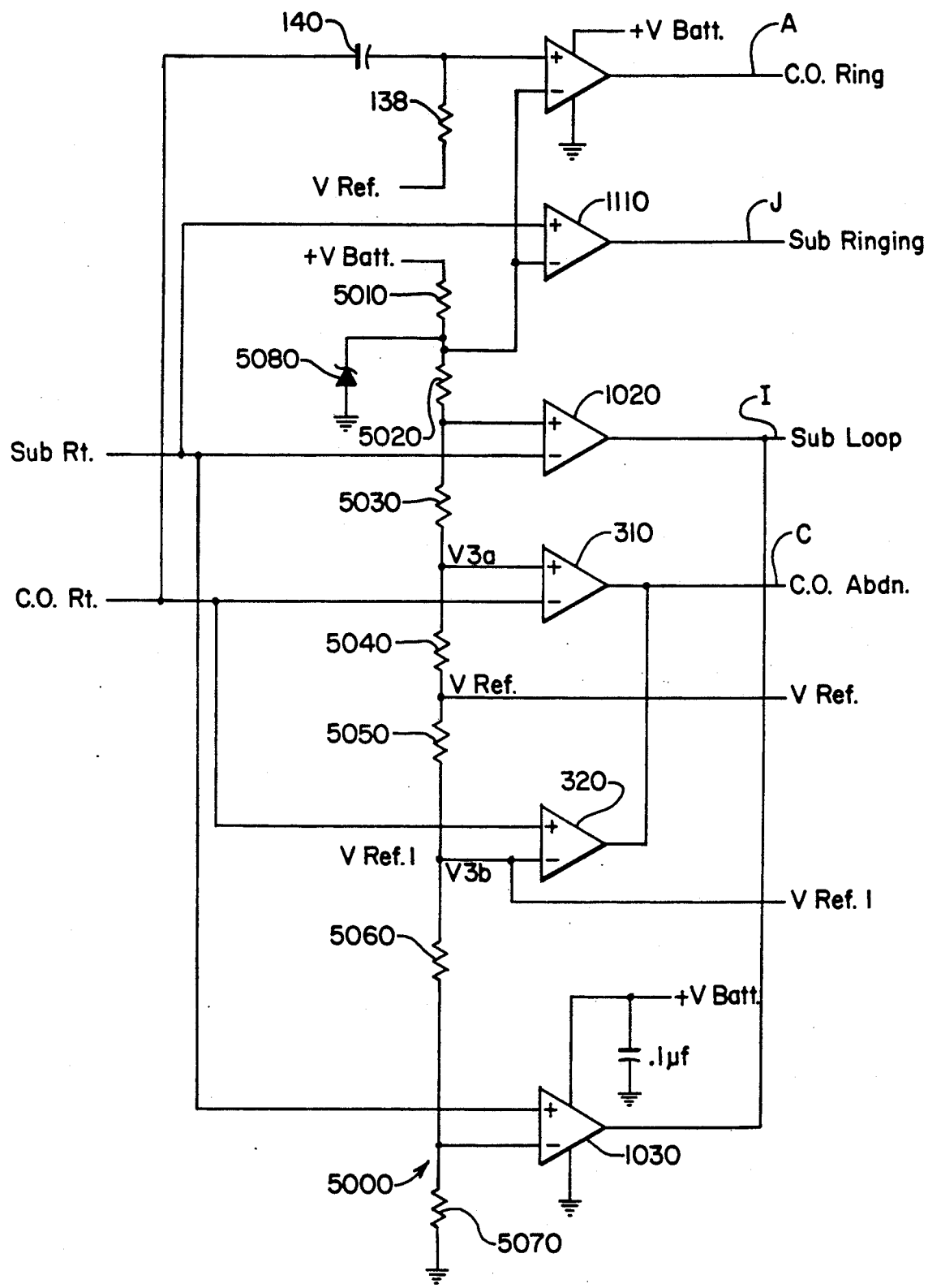

CO hold function 200 comprises transistor 210 (FIG. 3d), resistive element 220 (FIG. 3a), resistive element 230 (FIG. 3d), diode 240 (FIG. 3d), and relay 250 (FIG. 3a). When a high signal is sent from the controller 1200 along signal path B, the hold function 200 tells the CO that the line is still in use by providing a path for the battery feed current from the CO through resistor 220. The relay 250 is normally open, thus removing resistor 220 from the circuit. To energize the relay 250, and thus connect resistor 220 between the CO tip and CO ring lines 13, 14 to provide the path for the battery feed current, a high signal from controller 1200 travels along signal path B, passes through current limiting resistor 230 and turns on transistor 210. Transistor 210, when turned on, conducts and effectively grounds one end of the armature coil 250' (shown on FIG. 3d) of relay 250 (shown on FIG. 3a), the other end of which is connected to a positive voltage source VBATT (shown on FIG. 3d). Current then passes from VBATT, through the armature coil 250' of relay 250, through transistor 210 and on to ground, thereby energizing relay 250. Diode 240 prevents the inductive kickback from the armature coil of 250' from damaging transistor 210.

The hold abandon function 300 comprises the noninverting voltage feedback amplifier 110 (FIG. 3a) and its associated circuitry as discussed above. The output of 110 is fed at CO-RT into the inverting (−) input of op-amp 310 (FIG. 3b) and into the noninverting input (+) of op-amp 320 (FIG. 3b). The noninverting input of op-amp 310 and inverting input of op-amp 320 are connected to voltage dividing network 5000 at known voltage points V3a and V3b, respectively. When connected together in this manner, op-amps 310 and 320 operate as a window comparator, i.e., the output signal from the two op-amps 310, 320 is high when the input voltage falls between the two known voltages V3a and V3b. In the preferred embodiment, op-amps 110, 310, and 320 work together to provide a high output on signal path C when the voltage between CO tip and CO ring lines 13, 14 is between +2 volts and −2 volts. Hence, the hold abandon function 300 detects the momentary loss of battery feed current from the CO when the calling party has hung-up. A pull-up resistor 330 (FIG. 3d) is used as previously described to properly condition the output signal from op-amps 310, 320 on signal path C for the TTL input logic of the controller 1200.

The line splitting apparatus 400 can use two relays 410, 410', as shown in FIG. 1 and discussed above to switch the CO tip and CO ring lines 13, 14, or a double pole double throw (DPDT) relay can also be used to achieve the same switch functions. The armature coils 410" of either the two relays 410, 410' or of the DPDT relay alternative is shown in FIG. 3d. The line splitting apparatus 400 also comprises transistor 420, resistor 430, and diode 440, all shown in FIG. 3d. The described control function of the apparatus is essentially the same as that for the CO hold function 200. A high voltage signal from the controller 1200 travels along signal path D through current limiting resistor 430 and turns on transistor 420. Transistor 420, when turned on, grounds one terminal of the armature coils 410" of relays 410, 410', causing them to energize and disconnect the CO lines 13, 14 from the extension of those lines to local telephones 15, as best seen by reference to FIG. 1. As before, a diode 440 is used to prevent the inductive kickback from the relay coil 410" from damaging transistor 420, as shown in FIG. 3d.

Figure 3C:
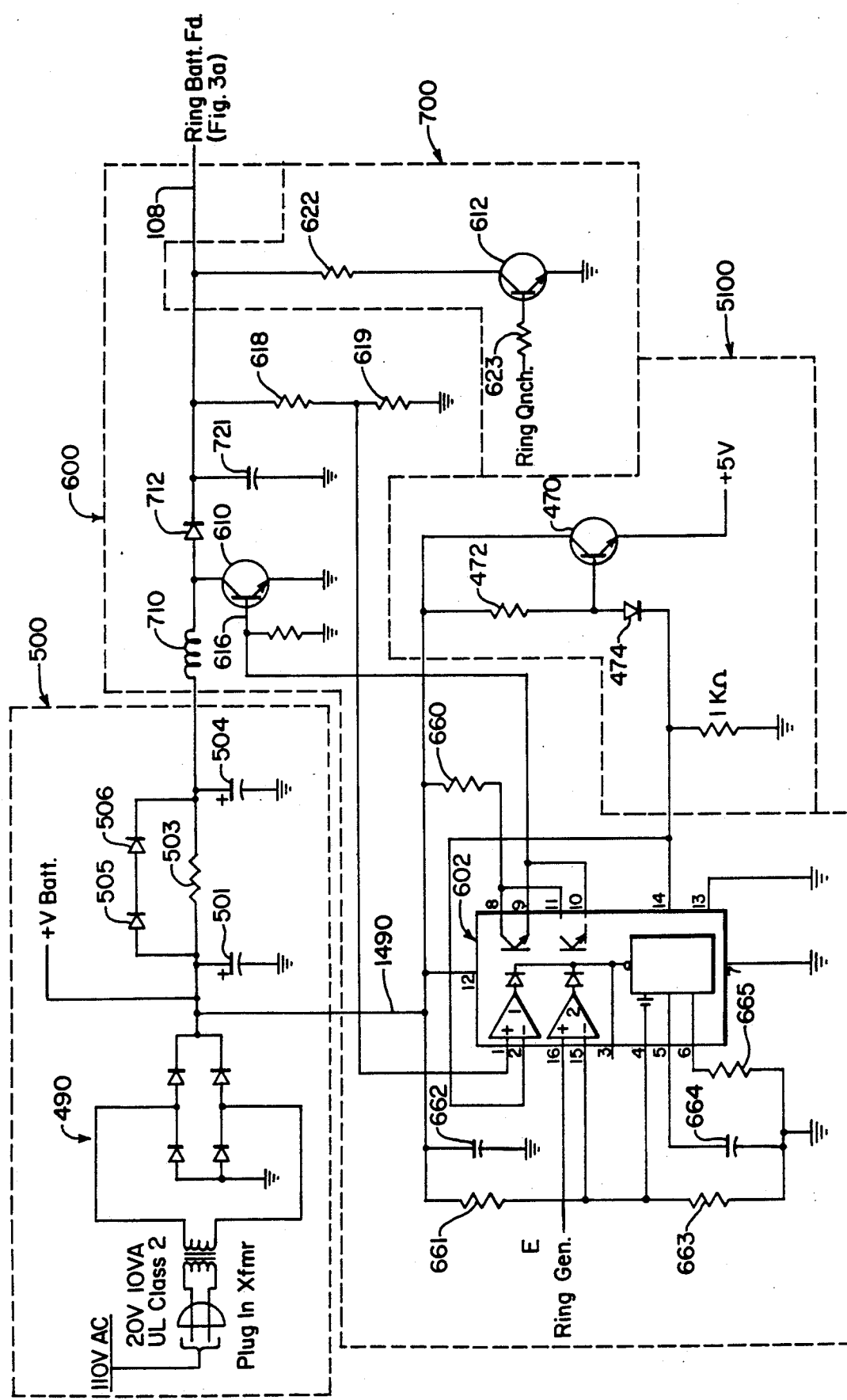

The local talk or intercom functions and the local ring generator 600 (FIG. 1) are powered by a local power supply 500, such as a 24 volt nominal dc power source, which is adequate to provide local talk power, also commonly called "battery" feed. It also provides the low voltage dc base for the higher voltage required for local ring generation, as will be described in more detail below. The local power can be provided by a power source 490 comprising an external transformer and conventional full wave rectifier circuit, as shown in FIG. 3c, which puts out 24 volts nominal (ranging from 21 to 31 volts). This 24 volt power is crudely filtered by capacitor 501, which has a nominal value of 1000 uF. A large 120 Hz ripple may remain from the dc power source 490; however, the power from dc power source 490, as filtered by capacitor 501, is adequate to power a conventional commercial power oscillator 602, such as the TL494 type device shown in FIG. 3c, for the ring generator as will be described in more detail below.

Further filtering of dc power source 490 is needed, however, for the local talk or "battery" feed power supply 500. Such further filtering can be provided by a resistor 503 having a nominal value of, for example, 22 ohms and capacitor 504 having a nominal value of, for example, 1000 uF to further filter the dc power source 490 during the times when the current in resistor 503 is insufficient to forward bias the silicon diodes 505 and 506 (about 60 milliamps), such as when the dc power supply is supplying a low normal operating current rather than a high ringing current. Thus, capacitor 501, resistor 503, and capacitor 504 act as a ripple filter for low current flows toward the ring wire 14, such as occur during the normal talking state. When dc power source 490 supplies a high current ringing signal, the diodes 505 and 506 are forward biased by resistor 503, thus providing a low impedance bypass path around resistor 503 for the higher current, and no large voltage drop or attendant power loss occurs.

During the intercom mode, the dc power source 490 outputs only a low current power. The line splitting apparatus 400 goes into the 'MADE' state and disconnects the local telephones 15 from the CO 16 by sending the tip wire segment 13' to route 107 and the ring wire segment 14' to route 108. The local telephones 15, therefore, receive power from the dc power source 490 through resistor 503, inductor 710, diode 712, feed resistor 714, and ring wire segment 14'. The circuit is completed through tip wire segment 13', feed resistor 716, and then to ground 113. Transistors 610 and 612 are part of the local ringing voltage generator 600. They are normally off, i.e. in a high impedance state. Also, inductor 710 and diode 712 do not have a material effect on the low current talk signal, i.e., they are nearly transparent to the low current or "battery" feed process described above, except for a voltage drop of approximately 0.6 volt across the diode 712.

Now, assuming that the local phones 15 are to be rung with, for example, a one second paging signal, such a one second paging ring may be caused by a one second burst of 20 Hz ringing voltage of about 90 volts rms on ring wire segment 14', via lead 108 and relay cut-off 410', as shown in FIGS. 1 and 3a. To accomplish this high voltage, oscillating ringing voltage signal, referring again to FIG. 3c, the 15 KHz oscillator 602 is enabled in 25 millisecond periods as directed by the controller 1200, through path E (controller 1200 is shown on FIG. 3d). Normally, when not in the local ringing mode, the controller 1200 sends a high voltage signal to oscillator 602, which keeps the oscillator 602 as well as transistor 610 off. When controller 1200 commands a ring, however, it sends a low signal for 25 millisecond intervals separated by 25 millisecond high intervals, which, as will be described below, causes the local ring voltage generator 600 to produce a square wave ring signal of the required 90 volt rms 20 Hz output. A one-second burst of 20 Hz ringing would require 20 such low/high sequences.

As mentioned above, the combination of inductor 710, transistor 610, diode 712, and capacitor 721 form a boost voltage generator to provide a step-up voltage ratio to increase the nominal 24 volts from the power supply 490 to an effective ring voltage, which, as described in more detail below, is regulated or held preferably at about 210 volts in the high segment of the above-described 20 Hz square wave oscillating ringing voltage. When the controller 1200 from FIG. 3d outputs a low signal on path E to oscillator 602 in FIG. 3c, as described above, the oscillator 602 applies a high frequency, 15 KHz on-off signal to the base 616 of transistor 610, which turns transistor 610 on and off at that 15 KHz rate. The resistor 620 assists oscillator 602 in turning off transistor 610. Each time transistor 610 turns on, it causes current to increase linearly in inductor 710 according to the law $di/dt = V/L$ as it flows to ground through transistor 610. In the present embodiment this process results in currents of approximately one ampere peak in inductor 710, which, as described above, is shunted around resistor 503 by diodes 505, 506. Inductor 710 preferably has about a one millihenry nominal inductance value for ringing six local telephones 15. Then, each time transistor 610 opens under control of oscillator 602, the current induced by inductor 710 goes through diode 712 into capacitor 721 as the collapsing magnetic field of inductor 710 induces a higher voltage on lead 108. Diode 712 prevents the high voltage generated in capacitor 721 from bleeding back into the inductor 710, and capacitor 721 also acts to smooth the high voltage on lead 108 as it is applied to ring wire segment 14' via feed resistor 714 in FIG. 3a.

The voltage level generated by the boost voltage generator according to this above-described process is dependent on the duty cycle of the 15 KHz on-off signal that is applied to the base 616 of transistor 610. The duty cycle is the ratio between the time the signal is "on" or "high" and the time the signal is "off" or "low". A change in the duty cycle therefore does not change the frequency of the on-off- signal, which is held at a constant 15 KHz in the preferred embodiment. In operation, an increase in the duty cycle of the 15 KHz on-off signal increases the time period when the signal is "on" in relation to the time it is "off" thereby causing an increase in the current flowing through inductor 710 according to the law $di/dt = V/L$. This increase in current is then converted into a proportional voltage increase when the magnetic field collapses. Conversely, a decrease in the duty cycle of the 15 KHz on-off signal lowers the peak voltage generated by inductor 710.

The peak voltage on capacitor 721, as mentioned above, is preferably approximately 210 volts. The inductor 710 waveform is shown enlarged in FIG. 4(d). The voltage at capacitor 721 is shown in FIG. 4(c), both during the 15 KHz oscillation high voltage interval 201 and at the 20 Hz rate of the overall square wave 202. A voltage feedback circuit is used to adjust the duty cycle of oscillator 602 to regulate or maintain the peak voltage 201 in FIG. 4(c) at the desired 210 volts as described above. Specifically, a feedback voltage is applied to sensing terminal pin 1 of oscillator 602 for varying the duty cycle of the on-off oscillating signal on pin 9, thus on base 616 of transistor 610, thereby adjusting the boost voltage at capacitor 721 and on line 108. This feedback voltage to pin 1 is linearly related to the voltage applied to the ring wire segment 14' via lead 108 due to resistive dividers 618 and 619. If the feedback voltage applied to sensing terminal pin 1 of the oscillator 602 is too low, therefore indicating a ringing voltage below 210 volts, the duty cycle of oscillator 602 is lengthened to increase the ringing voltage on line 108. This increase in ringing voltage results in an increase of the feedback voltage on pin 1, since the feedback voltage is derived from the ringing voltage via resistive dividers 618 and 619. Conversely, if the ringing voltage exceeds 210 volts, the feedback voltage applied to sensing terminal pin 1 increases and the duty cycle of oscillator 602 is shortened, thus reducing the ringing voltage. This voltage feedback circuit thus seeks to hold the feedback voltage applied to pin 1, and therefore, the ringing voltage on line 108, at a constant voltage. The ringing voltage will be proportional to the constant voltage at pin 1 in a ratio determined by divider resistors 618, 619, preferably about 210 volts during the active half of the 20 Hz ringing cycle. This voltage feedback regulator enables the ringing voltage peak 201 in FIG. 4(c) to be controlled at 210 volts, regardless of the number of local telephones 15 being rung. However, an excess load on the local ringing voltage generator 600, such as due to a short through a human body, results in rapid reduction of the voltage output, thereby enhancing user and installer safety.

Resistor 660 serves to limit the maximum current through the two output transistors at pins 9 and 10 of oscillator 602, which drive the ringing supply transistor 610. Since the transistor 610 must sink the large current flowing through inductor 710 during the process of generating a high voltage for ringing, about 1 ampere at peak, a significant base current into transistor 610 is required. The resistor 660 limits the base current into transistor 610 to avoid overloading the two output transistors in the oscillator 602.

Resistors 661 and 663 form a voltage dividing network. Resistor 661 drops the approximately 24 volts supplied by the dc power source 490 via lead 1490 down to about 0.7 volts, which 0.7 volts is then applied to oscillator 602 as a voltage reference for the logical control signals applied to oscillator 602 by the controller 1200. This logical control voltage can range from ground to 1.5 volts or more. Capacitor 662 serves to smooth any voltage transients induced by the current flowing through resistor 660. Capacitor 664 and resistor 665 provide control of internal timing parameters in oscillator 602. That is, the capacitor 664 and resistor 665 control the frequency of the oscillations generated by oscillator 602.

Conventionally, the telephone ringers or bells (not shown) of local telephones 15 are highly reactive, yet they require a square wave voltage to be activated and operated properly. Therefore, the low voltage portions of the square wave ring signal have to be held at a constant low voltage level, in spite of the voltage transients typically produced by the highly reactive conventional telephone ringers or bells. The resistors 618, 619 are sized to regulate the high voltage portions of the square wave cycle at 210 volts, but they are ineffective to regulate the low voltage portions of the square wave cycle constant in the face of such reactive transients. Therefore, to accomplish the low voltage cycle regulation, a ring quenching circuit 700 is provided. This ring quenching circuit 700 is shown in FIG. and it is shown in more detail in FIG. 3c comprising transistor 612 and resistors 622, 623.

During the 25 millisecond interval when the square wave ringing voltage of local ringing voltage generator is low, the transistor 610 is turned off, as described above, so the boost voltage generator components, including inductor 710, are essentially inactive, and the nominal voltage from power supply 490 on lead 108 is essentially about 24 volts, except for the reactive transients being fed back from the telephone ringers. To quench those reactive transients during these 25 millisecond low voltage intervals, the transistor 612 (quench switch), is turned on, the transistor 612 and resistor 622 functions to hold the resistor 714 to feed the ring wire 14', thus lead 108, at approximately 23 volts. This 23 volts is seen through inductor 710 and diode 712 when the ringing square wave signal must be low. The transistor 612 is turned on for these 25-millisecond low voltage intervals through resistor 623 by quench control voltage on path F from controller 1200. The quench control voltage signal 230 on path F from controller 1200 is illustrated at FIG. 4(b) in juxtaposition to the high voltage ring signal pattern of FIG. 4(c).

Figure 4A:
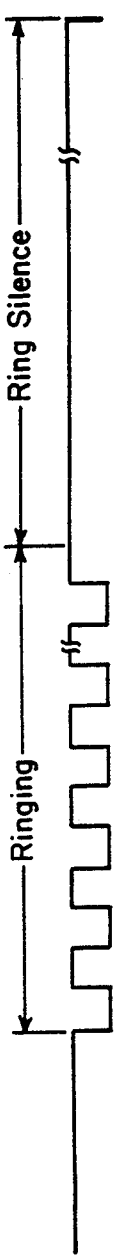
FIG. 4(a) is a drawing of the ring control voltage output waveform as used in the call manager.
Figure 4B:
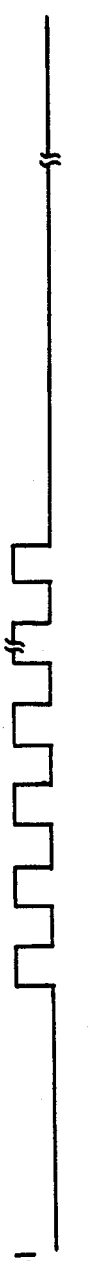
FIG. 4(b) is a drawing of the quench control voltage output waveform as used in the call manager.
Figure 4C:
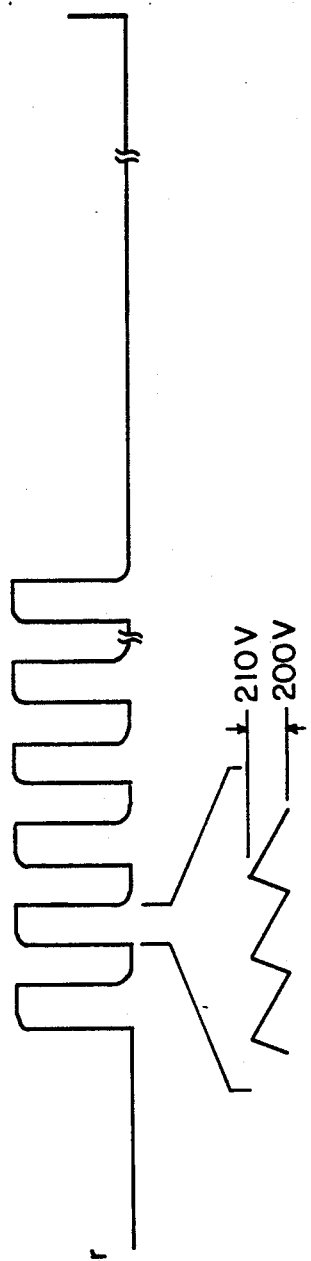
FIG. 4(c) is a drawing of the ring generator voltage output waveform as used in the call manager.
Figure 4D:
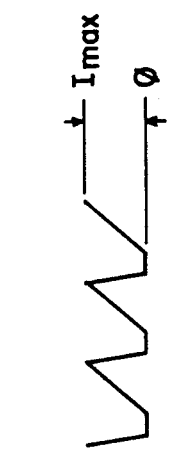
FIG. 4(d) is a drawing of the current output waveform in the inductor in the local ringing voltage generator as supplied by the local talk power supply, as used in the call manager.

FIGS. 4(a) through 4(d) show the two modes, ringing and ring silence in juxtaposition at various points. FIG. 4(a) shows the ring control voltage on path E produced by the controller 1200. FIG. 4(b) shows the quench control voltage signal 230 on path F produced by the controller 1200. FIG. 4(c) shows voltage on lead 108 at capacitor 721. FIG. 4(d) shows the current in inductor 710.

Both the ring control voltage of FIG. 4(a) and the quench control voltage 230 of FIG. 4(b) can be supplied by the controller 1200, as described above. However, other embodiments using separate components to supply these quench control voltage signals are possible. For example, an independent oscillator embodiment with associated circuitry (not shown) could also be used to provide the two control waveforms of FIG. 4(a) and (b). PNP transistor embodiments (not shown) are also possible.

The tone injection function 800, shown on FIG. 1 and in more detail on FIG. 3a, comprises resistive elements 810, 820, transistor 830, and diodes 840, 850. This tone injection circuit is a simple, one-transistor amplifier and functions to amplify the tone generated by the controller 1200 to a level that can be heard in the ear piece of conventional extension telephone. The tone generated by the controller 1200 travels along signal path G, through base resistor 820 and to the base of transistor 830. Diodes 840, 850 are positive clamping diodes to limit the voltage applied to transistor 830, thereby protecting it from damage.

The DTMF or touch tone detection circuit 900 comprises resistors 920, 930, and capacitor 950 in FIG. 3a and op-amp/comparator 910, resistor 940, and capacitor 960 in FIG. 3d. Referring to FIG. 3a, the circuit detects tone DTMF signal inputs by a touch tone telephone extension (e.g., three pushes of the "4" button) on lead 107 connected to tip line 13 or 13'. The tone or DTMF signal passes through ac coupling capacitor 950, which blocks dc voltage, and resistor 930 on FIG. 3a, from where it is input to the noninverting (+) input of op-amp/comparator 910 on FIG. 3d. The amplifier is reverse biased by voltage VREF passing through resistor 920 to increase the ac compliance of the output of op-amp/comparator 910. A known voltage VREFI, lower than VREF, is applied to the inverting (−) input of op-amp 910 so that it can function as a comparator. VREFI and VREF are supplied from the voltage divider network 5000 on FIG. 3b. When there is no touch tone (TTONE) signal from FIG. 3a, the output of op-amp/comparator 910 is high. However, when there is a TTONE signal on the noninventing input of op-amp/comparator 910 on path H the output pulses low, and capacitor 960 holds the voltage low between pulses. Hence, the output signal of comparator 910 on path H is low each time a tone is generated by a button push on an extension telephone. This output signal travels along signal path H to the controller 1200. A pull-up resistor 940 and holding capacitor 960 are used to properly condition the signal for input into the controller 1200.

The off hook, rotary dialing detector/flash detector 1000 in FIG. 1 performs two functions. First, it functions as a rotary dialing detector, and second, it functions as an off-hook and a flash detector. This circuit monitors the dc voltage on the tip and the ring wires connected to the local or extension side of the line 13' and 14'. The circuit 1000 detects an on-hook/off-hook transition by sensing the voltage fluctuation that occurs during an on-hook/off-hook transition. Since rotary dialing consists of a series of on-hook/off-hook transitions, the functions of off-hook or flash detection and rotary dialing detection are functionally identical. The controller 1200 distinguishes between the two functions by interpreting the different timing for the two conditions. The detection of an on-hook/off-hook transition is accomplished by op-amps 1010 and resistive elements 1040, 1050, 1060, 1070 in FIG. 3a, op-amps 1020, 1030 in FIG. 3b, and pull-up resistor 1080 in FIG. 3d. Op-amp 1010 in FIG. 3b is a noninverting voltage feedback amplifier that is used to isolate the voltages on the tip and ring lines 13' and 14' from the remaining circuitry of the invention. Op-amp 1010 functions similarly to op-amp 110 described above to provide a signal representative of the signal on the tip and ring lines 13' and 14', but at a lower voltage level compatible with the "downstream" circuitry. The output of op-amp 1010 on FIG. 3a is fed to the inputs of op-amps 1020 and 1030, which together function as a window comparator with an output signal that is high when the dc voltage between tip and ring lines 13 and 14 is between −20 volts and +20 volts. The resulting output signal from the two op-amps 1020, 1030 travels along signal path I to the controller 1200. The pull-up resistor 1080 is used to make the output signal on path I compatible with the input of controller 1200.

Local ring trip detector 1100 of FIG. 1 monitors the ac and dc voltages in the tip and ring lines 13' and 14' that connect to the local extension side of the invention. This circuit detects whether an extension goes off-hook (i.e. is picked up) during a ringing interval. If the above condition is detected, the controller 1200 removes or shuts off the ring signal to prevent the user from hearing a loud 20 Hz thudding sound in the telephone extension earpiece. The op-amp 1010 in FIG. 3a functions as described above in relation to the rotary dialing/flash detector 1000 to provide a suitable input to the op-amp 1110 in FIG. 3b, which functions as a comparator. The output signal of comparator 1110 is high when the ring-tip voltage on line 14' exceeds 53 volts, i.e., when there is a ringing voltage on line 14'. This output signal from op-amp/comparator 110 is carried along signal path J to the controller 1200, which, if the signal does not go high during ringing, turns off the above-described signals on paths E and F that actuate the ringing functions of local ringing voltage generator 600 and ringing voltage quench circuit 700. Again, a pull-up resistor 1120 is connected to signal path J to condition the signal thereon for controller 1200.

Figures 5A, 5B:
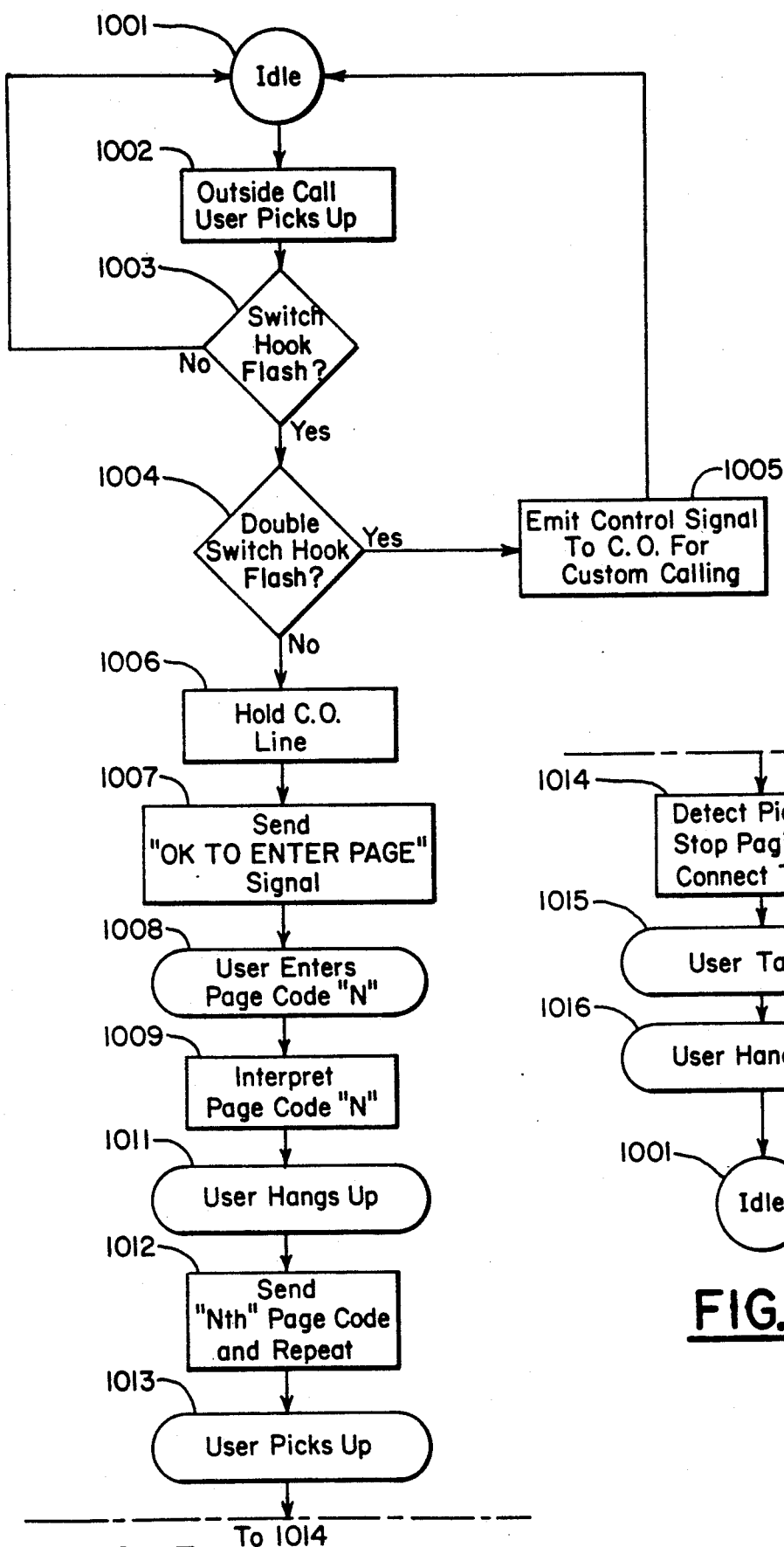
FIGS. 5a and 5b are a sequence of block diagrams showing the logic for the call manager controller during the incoming call sequence; and, FIGS. 6a and 6b are a sequence of block diagrams showing the logic for the call manager controller during the intercom mode of operation.

A reference voltage network 5000 in FIG. 5b functions to provide precisely controlled voltages for use by the op-amp/comparators 120, 310, 320, 1020, 1030 and 1110 and to provide the reference voltages VREF and VREF1. This reference voltage network 5000 comprises resistive elements 5010, 5020, 5030, 5040, 5050, 5060 and 5070, along with zener diode 5080. The resistors 5010 through 5070 are connected in series, with one end of 5010 connected to +VBATT and one end of resistor 5070 grounded. A zener diode 5080 is connected in parallel with resistors 5020 through 5070 to supply a constant, precisely regulated voltage potential across the divider network thereby allowing the voltages to be precisely maintained, even though the voltage source VBATT fluctuates. Thus, with proper resistor sizing that can be accomplished easily by persons skilled in the art, various desired voltages can be provided between each resistor as is appropriate for the functions and components described above. Transistor 470, resistor 472, and diode 474 in FIG. 3c form a 5-volt regulated power supply 5100 for powering the controller 1200 and a watchdog circuit which will be described below. Terminal 14 of oscillator 602 provides a precisely regulated output voltage of 5 volts. The current capability of this voltage is small, but it can be used to drive the simple high power voltage regulator 5100. Diode 474 is forward biased between the regulated 5 volt output of oscillator 602 and the crudely regulated 24 volts supplied by power supply 490 on lead 1490. Therefore, diode 474 presents a voltage of approximately 5.7 volts to the base of transistor 470. Since the base-emitter voltage drop of transistor 470 is also approximately 0.7 volts, a precisely regulated, high current capability 5 volt potential appears at the emitter. This regulated 5 volt supply is then used to run controller 1200 and watchdog circuit 50.

The watchdog circuit 50, shown in FIG. 3d, is well known in the art as a means to monitor the operation of a microprocessor, such as controller 1200. The circuit monitors pin 7 of the controller 1200. When the processor is operating normally, a regular series of control pulses appears on this pin. However, if these pulses stop, the watchdog circuit 50 is triggered and sends input pulses to the reset terminal pin 28 of the controller 1200 to reboot the processor.

The controller 1200 can be a microprocessor that has firmware programmed to accomplish all the logic for the various states described above in reference to FIG. 2. Additionally, the controller 1200 can provide optional logic to handle custom calling features similar to some CO options, such as call waiting, call forwarding, three-way calling, and speed dialing. The controller 1200 can be programmed in custom calling environments to look for two hook flashes from the local user to invoke the three-way calling feature or to respond to the call waiting signal by sending a single flash to the CO. Otherwise, the operation of the call manager 10 is the same for all central offices. The controller 1200, for the purposes of this invention, can be a 6804 or 6805 class of microprocessor. Numerous other embodiments of the controller 1200, the firmware, and the circuitry shown in FIG. 3, or other hard wired embodiments (not shown) can, of course, be used as substitutes for those described above, once the features of this invention are understood.

The following is an itemization of the values of the above listed components. The values are given by way of example only, and it must be understood that variations can be made in any or all of the itemized values without departing from the spirit or scope of the invention.

Resistors 130, 134, 1040, and 1060 can be 1 M$\Omega\pm1\%$ resistors. Resistors 132, 136, 1050, and 1070 can have values of 1M$\Omega\pm1\%$. Resistor 138 is 220K$\Omega$. Resistors 142, 330, 661, 930, 940, 1080, and 1120 can each be 39K$\Omega$ resistors. Resistors 220, 714, and 716 can be 270$\Omega\pm5\%$ resistors capable of handling 2 watts. Resistors 230, 430, 622, 623, 663, and 820 are 1K$\Omega$ resistors. Resistor 472 is 6.8K$\Omega$, 503 is 22$\Omega$, 618 is 270K$\Omega\pm1\%$ while resistor 619 has a value of 5.6K$\Omega\pm1\%$. Resistor 620 is 240K$\Omega$, 660 is 330$\Omega$, 665 is 6.81K$\Omega\pm1\%$, resistor 810 is 5.6K$\Omega$, and resistor 920 is 18K$\Omega$. Resistors 5010 and 5020 are 3.3K$\Omega$ each, resistors 5030 and 5060 are 1.5K$\Omega$ each, and resistors 5040 and 5050 are 220$\Omega$ each. Finally, resistor 5070 can be an 8.2K$\Omega$ resistor.

The capacitors used can be of the following values. Capacitors 140, 662, and 1090 are 0.1 $\mu$F, while capacitors 501 and 504 have a value of 1000 $\mu$F each. Capacitors 664 and 950 are precision capacitors having a value of 0.01 $\mu$F$\pm5\%$. Capacitor 7211 is a 250 volt capacitor having a value of 0.47 $\mu$F, while capacitor 960 is a 0.22 $\mu$F capacitor.

Diodes 240, 440, 474, 840, and 850 can be 1N4148 devices while diodes 505 and 506 are 1N4002 devices. A 1N5344 diode can be used for diode 712. Zener diode 5080 is a 16 volt, 0.25 W diode that can be a 1N4703, a 1N4110, or a 1N5246B device.

2N2222 transistors can be used for transistors 210, 420, and 830. Transistor 470 is a TIP-29 device while transistor 610 is a TIP-47. Transistor 612 is an MPS-A42.

As discussed above, inductor 710 is a 1 MH, 1 ampere inductor.

Operational amplifiers 110 and 1010 are TL-082 devices, while LM339's can be used for OP-amps 120, 310, 320, 910, 1020, 1030, and 1110. Finally, oscillator 602 is a TL-494 device.

An example of the stored logic for controller 1200 while executing a call sequence is shown in FIGS. 5a and 5b. The Idle 1001 state comprises the call manager 10 and the local telephones 15 powered up and connected as shown in FIGS. 1 and 3. The first condition that might occur, for example, could be for a user to make an outside call as shown by block 1002 in FIG. 5a. The user would normally dial straight out and not make a switch hook flash. Therefore, block 1003 would not detect a switch hook flash signal from the flash detector 1000 in FIG. 1 and would return the call manager 10 to Idle 1001. The user is unaware that anything is going on and simply dials out and makes his call. The call manager 10 is invisible to the user. The user could also, however, decide to use the call manager 10 to page a second user, who could join the call. To do so, the user would make a single switch hook flash. At that time the flash detector 1000 of call manager 10 would pick-up at Block 1003, and the logic would proceed sequentially through Blocks 1004–1016, as will be described below.

The next common condition to occur would be for the call manager 10 to receive an incoming call. The user would pick-up the receiver in Block 1002. If the user does not want to activate the call manager 10, he simply finishes his conversation and hangs up. In that case, Block 1003 would not sense a switch hook flash from flash detector 1000, and the logic would return the call manager 10 to Idle 1001.

Alternatively, the user could decide that the incoming call is meant for somebody else. In this case, the user would depress and release the receiver hook 2020 (in FIG. 2) once, thus making a switch hook flash. Block 1003 senses the switch hook flash signal from flash detector 1000 and sequences the 0 logic to Block 1004. Some central offices (CO's) offer custom calling features. A double switch hook flash, as mentioned above, could activate those features by causing Block 1005 to emit a single flash as a control signal to the central office. However, a single switch hook flash would sequence the logic further to Block 1006.

Block 1006 puts the incoming call on hold, thereby actuating the CO hold function 200 and the line-splitting relays 400 of FIG. 1 to allow all the local telephones (number 15 in FIGS. 1, 2, and 3) to act as a paging system while keeping the CO 16 on hold. Block 1007 actuates tone injector 800 of FIG. 1 to send a tone to the user telling him to enter a predesignated paging code for the person he wishes to pick-up the phone. Block 1008 shows the user entering a page code N.

The controller 1200 has been pre-programmed to accept one of two types of page codes. For example, one user may be assigned two rings, another user may be assigned three rings, and so forth for each local user. The first method for entering the predesignated paging code is to dial the paging code, such as the number three on a rotary dial phone, or to depress any key on a touch tone phone three times. The second method for entering the predesignated paging code (not shown in the embodiment) allows the touch tone user to simply push the "3" key. In either case, each local user has a predesignated paging code based on a series of short rings followed by a pause and then repeated. For the purposes of describing the present invention these methods produce the same result.

After the user enters page code "N" in Block 1008, the call manager 10 recognizes the page code (such as three short rings) in Block 1009 from signals either from the DTMF energy detection function 900 or from the flash or dialing detector function 1000, as appropriate from FIG. 1. Next the user hangs up in Block 1011. The call manager 10 then sends "N" (3) rings to all local phones by actuating the local ringing generator 600 and reactive voltage quench 700 functions of FIG. 1 and repeats this paging code continuously in Block 10212.

At some point a user will pick-up a local phone as shown by Block 1013. Block 1014 shows the call manager 10 detecting the user pick-up signal from the local ring trip detector 11 in FIG. 1, which is also termed an off hook condition, whereupon the call manager 10 immediately stops the page code ringing signals to generator 600 and quencher 700 and then re-connects the local telephones to the CO 16 by actuating relay 400 in FIG. 1. If it's the second user with three rings who picked up, then he'll talk. If it's someone else, then such other user can take a message for the second user. The user completes his conversation in Block 1015, until he hangs up in Block 1016, which returns the call manager 10 to Idle 1001.

Figure 6A:
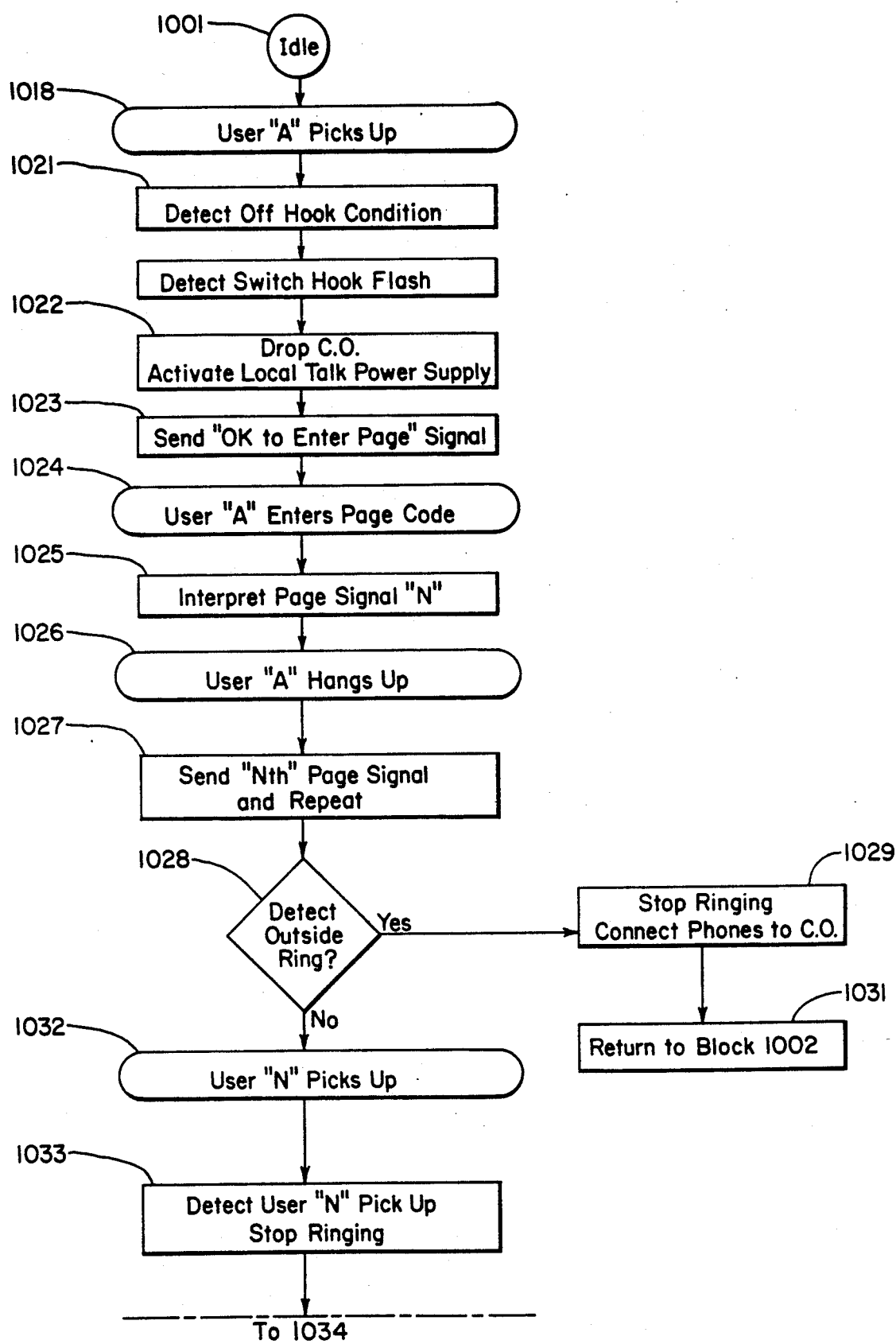
Figure 6B:
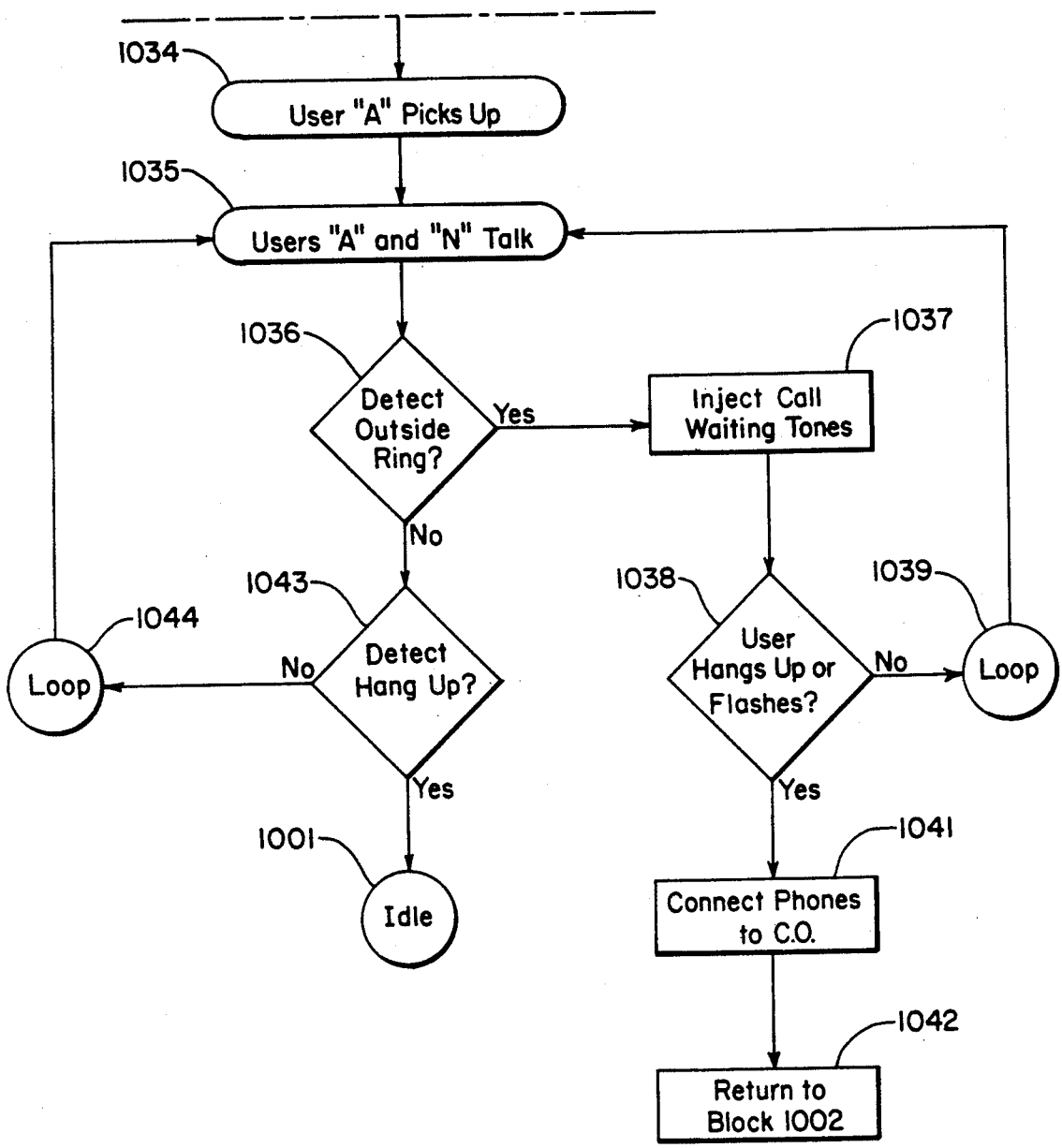

Referring next to FIGS. 6a and 6b, the stored logic of controller 12 in call manager 10 is shown executing the intercom function. Again, the call manager 10 begins in Idle 1001. A user designated as "A" picks-up a receiver in Block 1018 in preparation for calling another local user designated as "N". The call manager 10 in Block 1021 detects the off hook condition signal from the off-hook detector 1000 in FIG. 1 caused by user "A" picking up the receiver. In Block 1022 the call manager 10 drops the CO 16 by actuating relays 400 and activates the local talk power supply 500 in FIG. 1. Next, in Block 1023, the call manager 10 sends a tone by actuating tone injection function 800 of FIG. 1, thereby indicating to user "A" that he can now enter the predesignated paging code for user "N".

Block 1024 shows user "A" entering the paging code for user "N". The call manager 10 in Block 1025 interprets the 10 paging code for user "N" as picked up by either DTMF energy detection function 900 or dialing detector 1000 in FIG. 1. User "A" then hangs up in Block 1026. The call manager 10 rings all the local phones "N" times by actuating local ring voltage generator 600 and quench 700 in FIG. 1 and repeats this code until, in Block 1032, user "N" picks up, which is detected by local trip ring detector 1100 in FIG. 1. In the meantime, if an outside call should come through at the same time from the CO 16, then Block 1028 would detect the outside ring by a signal from CO ringing detector 100 in FIG. 1, and Block 1029 would stop ringing the page code of "N" by deactivating local ring voltage generator 600 and quench 700 while simultaneously connecting all the phones 15 to the CO 16 by actuating relays 400. Block 1029 then returns the call manager 10 to Block 1002 of FIG. 5a to receive the incoming call in the conventional manner.

On the other hand, if no incoming call came in, then Block 1033 detects user "N's" picking up of the receiver by a signal from off-hook detector 1000 in FIG. and Block 1033 proceeds to stop the ringing of "N's" page code by deactuating local ring voltage generator 600 and quench 700. When the phones stop ringing, user "A" knows that user "N" or someone else has picked up a phone. Therefore, Block 1034 shows user "A" picking up his receiver again to talk to user "N". Users "A" and "N" talk via intercom mode in Block 1035 with local power supply 500 in FIG. 1 providing the required low voltage talk power or "battery" feed, instead of the CO 16. Block 1043 in FIG. 6b shows either user "A" or user "N" hanging up, thereby returning the call manager 10 to Idle 1001 by actuating relays 400 to reconnect the telephones 15 to CO 16 in FIG. 1.

During the intercom call, loop 1044 in FIG. 6b maintains vigilance for an outside call. If, during the intercom call, an outside call came in, then Block 1036 would detect the outside call by a signal from CO ringing detector 100 in FIG. 1 and go to Block 1037 in FIG. 6b, which injects a tone designating an incoming call to users "A" and "N" by actuating tone injection function 800 of FIG. 1. Usually either or both users "A" and "N" would hang up as shown in Block 1038. If either user "A" or user "N" hangs up, then Block 1041 re-connects the phones to the CO 16 by actuating relays 400, and Block 1042 returns the call manager to Block 1002 of FIG. 5a. If, however, users "A" and "N" wish to ignore the incoming call, then Block 1038 maintains the intercom status via loop 1039.

The foregoing description is considered as illustrative only of the principles of the invention. Further, since numerous modifications and changes will readily occur to those skilled in the art it is not desired to limit the invention to the exact construction and processes shown and described above. Accordingly, all suitable modifications and equivalents may be resorted to falling within the scope of the invention as defined by the claims which follow.

The embodiments of the invention in which an exclusive property or privilege is claimed are defined as follows:

1. Ring voltage generator apparatus for generating an oscillating high voltage ring signal adapted to actuate a high voltage, bell-type alerting device in a telephone, comprising:
   low voltage supply means for supplying a low voltage output;
   selectively actuateable and deactuateable boost voltage generating means connected to said low voltage supply means and to said telephone for boosting said low voltage output of said low voltage supply means to a high voltage output, said boost voltage generating means including a diode and an inductor connected to said low voltage supply means, a capacitor connected between the diode and ground, transistor switch means also connected to said diode, and high frequency oscillating means connected to said transistor switch means for oscillatingly opening and closing the transistor switch means to produce a high frequency oscillating signal; and
   ringing generator timer means connected to said high frequency oscillating means to sequentially actuate and deactuate said boost voltage generating means via said transistor switch means.

2. The ring voltage generator apparatus of claim 1, including filter means connected to said lower voltage supply means and to said inductor for smoothing the output of said low voltage supply means when said ring signal is not being generated, and high current bypass means positioned in parallel around said filter means for shunting high current draws around said filter means during generation of said ring signal.

3. The ring voltage generator apparatus of claim 1, including voltage regulator means connected to said boost voltage generating means for holding the high voltage phases of said oscillating ring signal at a predetermined high voltage level.

4. The ring voltage generator apparatus of claim 3, wherein said voltage regulator means comprises duty cycle adjusting means connected to said high frequency oscillating means for selectively increasing and decreasing the duty cycle of said high frequency oscillating signal.

5. The ring voltage generator apparatus of claim 4, wherein said duty cycle adjusting means is responsive to a sensed voltage for varying the duty cycle of said high frequency oscillating signal in relation to variations in said sensed voltage.

6. The ring voltage generator apparatus of claim 5, including voltage feedback means connected to said boost voltage generating means and to said duty cycle adjusting means for providing said sensed voltage to said duty cycle adjusting means.

7. The ring voltage generator apparatus of claim 6, wherein said voltage feedback means includes voltage divider means connected to said boost voltage generating means for producing said sensed voltage in linear proportion to said ring signal.

8. The ring voltage generator apparatus of claim 1, wherein the low voltage supply means provides low-voltage "battery" feed to the telephone.

9. Ring voltage generator apparatus for generating an oscillating high voltage ring signal adapted to actuate a high voltage, bell-type alerting device in a conventional telephone or telephone-like device, comprising:
   a local low voltage "battery" feed for providing low voltage "talk power" for said telephone or telephone-like device;
   a circuit for connecting said local low voltage "battery" feed to said telephone or telephone-like device;
   selectively actuateable and deactuateable boost voltage generating means positioned in said circuit for boosting the low voltage in said circuit from said local low voltage "battery" feed to high voltage in said circuit; and
   ringing generator timer means connected to said boost voltage generating means for sequentially actuating and deactuating said boost voltage generating means at predetermined time intervals to generate an oscillating ring signal in said circuit comprising sequential alternating timed intervals of said high and low voltages in said circuit with an oscillation frequency and high and low voltage levels adapted to actuate said high voltage bell-type alerting device in said telephone or telephone-like device.

10. The ring voltage generator apparatus of claim 9, including quench means connected to said circuit for quenching reactive voltage transients from the high voltage bell-type alerting device in said telephone or telephone-like device.

11. The ring voltage generator apparatus of claim 10, wherein said quench means includes a resistive ground circuit with a quench switch therein, which resistive circuit when connected to ground holds a pre-selected minimum voltage in the low voltage phase of the oscillating ring signal while quenching the reactive transients, and quench control means connected to said quench switch and coordinated with said ring generator timer means for turning said quench switch on to close the ground circuit when said boost voltage generating means is deactuated during generation of said oscillating ring signal, for turning said quench switch off to open said resistive ground circuit when said boost voltage generating means is actuated, and for holding said quench switch off during times when an oscillating ring signal is not being generated.

12. The ring voltage generator apparatus of claim 9, including voltage regulator means connected to said boost voltage generating means for holding the high voltage phases of said oscillating ring signal at a predetermined high voltage level.

13. The ring voltage generator apparatus of claim 9, wherein said boost voltage generating means includes a diode and an inductor positioned in said circuit, a capacitor connected between said circuit and a ground, transistor switch means also connected to said circuit, and high frequency oscillating means connected to said transistor switch means for oscillatingly opening and closing said transistor switch means to produce a high frequency oscillating signal, and wherein said ringing generator timer means is connected to said high frequency oscillating means to sequentially actuate and deactuate said boost voltage generating means via said transistor switch means.

14. The ring voltage generator apparatus of claim 13, including filter means connected to said low voltage "battery" feed and to said inductor for smoothing said low voltage "talk power" when said ring signal is not being generated, and high current bypass means positioned in parallel around said filter means for shunting high currently draws around said filter means during generation of said ring signal.

15. The ring voltage generator apparatus of claim 13, including voltage regulator means connected to said boost voltage generating means for holding the high voltage phases of said oscillating ring signal at a predetermined high voltage level.

16. The ring voltage generator apparatus of claim 15, wherein said voltage regulator means comprises duty cycle adjusting means connected to said high frequency oscillating means for selectively increasing and decreasing the duty cycle of said high frequency signal.

17. The ring voltage generator apparatus of claim 16, wherein said duty cycle adjusting means is responsive to a sensed voltage for varying the duty cycle of said high frequency signal in relation to variations in said sensed voltage.

18. The ring voltage generator apparatus of claim 17, including voltage feedback means connected to said boost voltage generating means and to said duty cycle adjusting means for providing said sensed voltage in said duty cycle adjusting means.

19. The ring voltage generator apparatus of claim 18, wherein said voltage feedback means includes voltage divider means connected to said boost voltage generating means for producing said sensed voltage in linear proportion to said ring signal.

20. A method of creating a high voltage oscillating ring signal for actuating a high voltage bell-type alerting device of a low voltage powered telephone or telephone-like device, comprising the steps of:
   powering said telephone or telephone-like device by a low voltage produced by a local low voltage "battery" feed connected to said telephone or telephone-like device by a circuit, and
   generating an oscillating ring signal comprising a sequence of alternating high and low voltages with an oscillation frequency and high and low voltage levels adapted to actuate said high voltage bell-type alerting device by alternately boosting and not boosting said low voltage in said circuit in sequential periodic time intervals.

21. The method of claim 20 further comprising the step of quenching reactive voltage transients from the high voltage bell-type alerting device.

22. The method of claim 20 where the periodic time intervals are approximately 25 milliseconds for high voltages and 25 milliseconds for low voltages to produce an approximately 20 Hz oscillating ring signal.

* * * * *